United States Patent
Wettling et al.

(10) Patent No.: US 8,853,336 B2
(45) Date of Patent: Oct. 7, 2014

(54) BORON TRIFLUORIDE-CATALYST COMPLEX AND PROCESS FOR PREPARING HIGH-REACTIVITY ISOBUTENE HOMOPOLYMERS

(71) Applicants: Thomas Wettling, Limburgerhof (DE); Stefan Hirsch, Neustadt (DE); Markus Brym, Limburgerhof (DE); Markus Weis, Roemerberg (DE)

(72) Inventors: Thomas Wettling, Limburgerhof (DE); Stefan Hirsch, Neustadt (DE); Markus Brym, Limburgerhof (DE); Markus Weis, Roemerberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/768,601

(22) Filed: Feb. 15, 2013

(65) Prior Publication Data

US 2013/0217848 A1    Aug. 22, 2013

Related U.S. Application Data

(60) Provisional application No. 61/599,945, filed on Feb. 17, 2012.

(51) Int. Cl.
*C08F 4/00* (2006.01)
*C08F 10/00* (2006.01)
*C08F 110/10* (2006.01)

(52) U.S. Cl.
CPC ................................ *C08F 110/10* (2013.01)
USPC ........................ 526/237; 526/348.7

(58) Field of Classification Search
CPC ........... C08F 110/10; C08F 36/04; C08F 4/14
USPC .............................. 526/237, 348.7
See application file for complete search history.

(56) References Cited

U.S. PATENT DOCUMENTS

| | | |
|---|---|---|
| 2006/0063901 A1 | 3/2006 | Rath et al. |
| 2006/0122447 A1 | 6/2006 | Rath et al. |
| 2008/0249268 A1* | 10/2008 | Rath et al. ............. 526/204 |

FOREIGN PATENT DOCUMENTS

| | | |
|---|---|---|
| DE | 27 02 604 | 7/1978 |
| DE | 100 28 585 A1 | 12/2001 |
| WO | WO 99/64482 A1 | 12/1999 |
| WO | WO 01/27172 A1 | 4/2001 |
| WO | WO 2004/029099 A1 | 4/2004 |
| WO | WO 2004/065432 A1 | 8/2004 |
| WO | WO 2005/066222 A1 | 7/2005 |
| WO | WO 2007/006556 A1 | 1/2007 |

OTHER PUBLICATIONS

International Search Report with Written Opinion issued May 31, 2013, in PCT/EP2013/052800, filed Feb. 13, 2013 with English translation of category of cited documents.

* cited by examiner

*Primary Examiner* — William Cheung
(74) *Attorney, Agent, or Firm* — Oblon, Spivak, McClelland, Maier & Neustadt, L.L.P.

(57) ABSTRACT

A catalyst complex composed of boron trifluoride and a cocatalyst mixture of 10 to 90% by weight of a monohydric primary $C_1$- to $C_{20}$-alcohol and 90 to 10% by weight of a monohydric secondary $C_3$- to $C_{20}$-alcohol, where the molar ratio of boron trifluoride to the sum of all alcohols is 2:1 to 1:10. This catalyst complex is used in the preparation of high-reactivity isobutene homopolymers having a number-average molecular weight of 300 to 50 000, using, as the feedstock, a $C_4$ hydrocarbon mixture comprising at least 20% by weight of isobutene and a total of at least 10% by weight of other $C_4$ olefins.

16 Claims, No Drawings

BORON TRIFLUORIDE-CATALYST COMPLEX AND PROCESS FOR PREPARING HIGH-REACTIVITY ISOBUTENE HOMOPOLYMERS

The present invention relates to a novel boron trifluoride-catalyst complex and to an improved process for preparing high-reactivity isobutene homopolymers having a number-average molecular weight of 300 to 50 000 by polymerizing isobutene in the liquid phase in the presence of this boron trifluoride-catalyst complex.

In contrast to what are called low-reactivity polymers, high-reactivity isobutene homopolymers are understood to mean those polyisobutenes which comprise a high content of terminal vinylidene double bonds (α-double bonds), ethylenic usually in practice of at least 80 mol %, based on the individual chain ends of the polyisobutene macromolecules. In the context of the present application, vinylidene groups are understood to mean those double bonds whose position in the polyisobutene macromolecule is described by the general formula

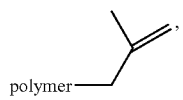

i.e. the double bond is present in an α position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions. The uses of high-reactivity polyisobutenes include use as intermediates for preparing additives for lubricants and fuels, as described, for example, in DE-A 27 02 604.

Such high-reactivity polyisobutenes are obtainable, for example, by the process of patent specification DE-A 27 02 604 C2 (1) by cationic polymerization of isobutene in the liquid phase in the presence of pure boron trifluoride as a catalyst. A disadvantage here is that the polyisobutenes obtained have a relatively high polydispersity. The polydispersity is a measure of the molecular weight distribution of the resulting polymer chains and corresponds to the quotient of weight-average molecular weight $M_w$ and number-average molecular weight $M_n$ (PDI=$M_w/M_n$).

Polyisobutenes with a similarly high proportion of terminal vinylidene double bonds but with a narrower molecular weight distribution are obtainable by effecting the polymerization in the presence of a boron trifluoride catalyst deactivated with particular oxygen-containing organic compounds such as alcohols or ethers, or mixtures of such compounds.

For instance, WO 99/64482 (2) recommends, for preparation of high-reactivity polyisobutenes, a catalyst complex consisting of boron trifluoride and (a) a primary alcohol having 1 to 20 carbon atoms or a secondary alcohol having 3 to 20 carbon atoms or a mixture of these alcohols, and (b) an ether free of tertiary alkyl groups.

WO 01/27172 A1 (3) describes isobutene polymerization in the presence of a boron trifluoride-catalyst complex which comprises at least one oxygen-containing compound such as water or an organic compound having up to 30 carbon atoms, especially monohydric secondary alcohols having 3 to 20 carbon atoms, optionally together with $C_1$- to $C_{20}$-dialkyl ethers.

WO 2004/029099 A1 (4) discloses boron trifluoride complex catalysts suitable for isobutene polymerization, composed of boron trifluoride, at least one tertiary alcohol such as tert-butanol and at least one compound selected from water, primary alcohols, secondary alcohols, dialkyl ethers, alkanecarboxylic acids and phenols, where the third component may explicitly also be a mixture of primary and secondary alcohols.

WO 2004/065432 A1 (5) describes the polymerization of isobutene in the presence of a boron trifluoride catalyst consisting of boron trifluoride, a component ($L^1$) which may be water, primary $C_1$- to $C_5$-alkanol and/or secondary $C_3$- to $C_5$-alkanol, a further component ($L^2$) in the form of an aldehyde and/or ketone, and an optional component ($L^3$) in the form of an ether having at least 5 carbon atoms, a primary or secondary alcohol having at least 6 carbon atoms or a tertiary alcohol.

WO 2007/006556 A1 (6) discloses boron trifluoride complex catalysts for the polymerization of isobutene, which comprise, as cocatalysts, compounds having an abstractable hydrogen atom. Compounds having an abstractable hydrogen atom mentioned are: water, methanol, ethanol, 2-propanol, 1-propanol, 2-butanol, sec-pentanol, sec-hexanol, sec-heptanol and/or sec-octanol; additionally suitable are also phenols and cresols, and also tert-butyl ethers and halohydrocarbons. Among these compounds, methanol and 2-propanol are the most preferred.

The prior art boron trifluoride-catalyst complexes, however, still have disadvantages, especially in the case of use of economically particularly favorable technical $C_4$ hydrocarbon streams as the feedstock. In particular, the troublesome fluorine content which occurs in the resulting polyisobutene and originates through incorporation of fluoride from the boron trifluoride is still too high. The fluorine content can be lowered by lowering or omitting the proportion of primary alcohols in the catalyst complex, but this usually lowers the catalyst activity, which results in a higher boron trifluoride consumption. A higher boron trifluoride consumption greatly increases the wastewater pollution.

It was an object of the present invention to provide a more economically effective boron trifluoride-catalyst complex which ensures both a low fluorine content and a low boron trifluoride consumption with equally good product properties, more particularly even when technical $C_4$ hydrocarbon streams which also comprise $C_4$ olefins other than isobutene in significant amounts are used as the feedstock.

Accordingly, a boron trifluoride-catalyst complex has been found for polymerization of isobutene, consisting of boron trifluoride as a polymerization catalyst and a cocatalyst mixture of (A) 10 to 90% by weight, preferably 20 to 80% by weight, especially 25 to 75% by weight, and in particular 30 to 70% by weight, of at least one monohydric primary alcohol having 1 to 20 carbon atoms and (B) 90 to 10% by weight, preferably 80 to 20% by weight, especially 75 to 25% by weight, and in particular 70 to 30% by weight, of at least one monohydric secondary alcohol having 3 to 20 carbon atoms, where the molar ratio of boron trifluoride to the sum of all cocatalyst alcohols from (A) and (B) is 2:1 to 1:10.

A particularly favorable mixture is one of equal parts by weight or approximately equal parts by weight of components (A) and (B), for instance composed of 45 to 55% by weight of (A) and 55 to 45% by weight of (B).

Useful components (A) of the cocatalyst mixture are preferably primary $C_1$- to $C_{20}$-alkanols, especially primary $C_1$- to $C_8$-alkanols, in particular primary $C_1$- to $C_4$-alkanols, which may be straight-chain or branched. Examples thereof are methanol, ethanol, n-propanol, n-butanol, isobutanol, n-pentanol, n-hexanol, n-heptanol, n-octanol, 2-ethylhexanol, n-nonanol, n-decanol, 2-propylheptanol, n-undecanol, n-dodecanol, n-tridecanol, isotridecanol, n-tetradecanol, n-hexadecanol, n-octadecanol and n-eicosanol. As well as primary alkanols of this kind, it is, however, also possible to use monohydric primary cycloalkyl alcohols, unsaturated monohydric primary alcohols which are not polymerizable under the present reaction conditions, and monohydric primary alcohols having aromatic and/or heteroaromatic radicals each having up to 20 carbon atoms in the molecule, for example cyclohexylmethanol, oleyl alcohol or benzyl alcohol.

In a preferred embodiment, the at least one monohydric primary alcohol (A) of the cocatalyst mixture is selected from methanol, ethanol, 1-propanol and 1-butanol.

Useful components (B) of the cocatalyst mixtures are preferably secondary $C_3$- to $C_{20}$-alkanols, especially secondary $C_3$- to $C_8$-alkanols, in particular secondary $C_3$- to $C_4$-alkanols. Examples thereof are isopropanol, 2-butanol, sec-pentanol, sec-hexanol, sec-heptanol, sec-octanol, sec-nonanol, sec-decanol, sec-undecanol, sec-dodecanol and sec-tridecanol. As well as secondary alkanols of this kind, it is, however, also possible to use monohydric secondary cycloalkyl alcohols, unsaturated monohydric secondary alcohols which are not polymerizable under the present reaction conditions, and monohydric secondary alcohols having aromatic and/or heteroaromatic radicals each having up to 20 carbon atoms in the molecule, for example cyclohexanol or 2-phenylethanol.

In a preferred embodiment, the at least one monohydric secondary alcohol (A) of the cocatalyst mixture is selected from isopropanol and 2-butanol.

The inventive boron trifluoride-catalyst complex, aside from the boron trifluoride active as a polymerization catalyst, does not comprise any further polymerization active catalyst component and, aside from the cocatalyst mixture of the alcohols (A) and (B), does not comprise any further cocatalyzing or catalyst activity-moderating component, for example a tertiary alcohol, an ether, an aldehyde, a ketone, a phenol or a carboxylic acid. Water present in traces in the reaction mixture, for instance below 50 ppm by weight, is unimportant in this context.

This boron trifluoride-catalyst complex is used as an inventive measure in the preparation of high-reactivity isobutene homopolymers. The present application accordingly also provides a process for preparing high-reactivity isobutene homopolymers having a number-average molecular weight of 300 to 50 000 by polymerizing isobutene in the liquid phase in the presence of a polymerization catalyst based on boron trifluoride, where as a feedstock a $C_4$ hydrocarbon mixture comprising at least 20% by weight of isobutene and a total of at least 10% by weight of other $C_4$-olefins, which comprises using, as the polymerization catalyst, the boron trifluoride-catalyst complex mentioned.

Isobutene homopolymers are understood in the context of the present invention to mean those polymers which, based on the polymer, are formed from isobutene to an extent of at least 98 mol %, preferably to an extent of at least 99 mol %.

The $C_4$ hydrocarbon mixture used comprises the isobutene generally in an amount of 20 to 90%, especially 25 to 75% by weight, in particular 30 to 60% by weight. The other $C_4$ olefins also present—which are typically 1-butene, cis-2-butene, trans-2-butene and/or 1,3-butadiene—are present in the mixture generally in an amount of 10 to 70% by weight, especially 25 to 65% by weight, in particular 40 to 55% by weight. In addition, saturated $C_4$ hydrocarbons such as n-butane and/or isobutane are normally also present, usually in amounts of 5 to 30% by weight, especially 10 to 25% by weight, in particular 12 to 20% by weight. The $C_4$ hydrocarbon mixture used may additionally comprise, in minor amounts—usually in the low one-digit percent range—olefinic and/or saturated hydrocarbons having fewer or more than 4 carbon atoms, for example propene, propane, n-pentane, isopentane or 1-pentene.

The isobutenic $C_4$ hydrocarbon mixture used may comprise small amounts of contaminants such as water or mineral acids—usually in the ppm range—without any critical yield or selectivity losses. It is appropriate to the purpose to avoid enrichment of these impurities by removing such harmful substances from the isobutenic monomer mixture, for example by adsorption onto solid adsorbents such as activated carbon, molecular sieves or ion exchangers.

In a preferred embodiment, the process according to the invention for preparing high-reactivity isobutene homopolymers is operated continuously, and the $C_4$ hydrocarbon mixture used is a technical $C_4$ hydrocarbon stream selected from $C_4$ raffinates, $C_4$ cuts from isobutane dehydrogenation, and $C_4$ cuts from steamcrackers and fluid catalyzed crackers (FCC crackers). A $C_4$ hydrocarbon stream from an FCC refinery unit is also known as a "b/b" stream. Among the $C_4$ raffinates, raffinate 1 is especially suitable. If the intention is to use a raffinate 2 stream as the feedstock, it is usually necessary to increase the isobutene concentration therein beforehand in a suitable manner. Further suitable isobutenic technical $C_4$ hydrocarbon streams are, for example, also the product stream of a propylene-isobutane cooxidation or the product stream from a metathesis unit, which are generally used after customary purification and/or concentration. Suitable technical $C_4$ hydrocarbon streams generally comprise less than 500 ppm, preferably less than 200 ppm, of butadiene. The isobutene from such technical $C_4$ hydrocarbon streams polymerizes under the conditions of the present invention substantially selectively to give the desired isobutene homopolymer, without incorporation of significant amounts of other $C_4$ monomers into the polymer chain.

Typically, the isobutene concentration in the technical $C_4$ hydrocarbon streams mentioned is in the range from 30 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes. The process according to the invention can in principle, however, also be operated with isobutenic technical $C_4$ hydrocarbon streams comprising less isobutene, for example only 10 to less than 30% by weight.

The boron trifluoride and the cocatalyst mixture of (A) and (B) can be premixed and introduced into the polymerization reactor already in the form of an active complex. Alternatively, however, the boron trifluoride (in gaseous form, in liquid form or in an inert solvent or diluent) and the cocatalyst mixture, or the individual alcohols (A) and (B), can also be supplied separately to the polymerization medium. It is essential, however, that the inventive boron trifluoride-catalyst complex is present in essentially complete form before it comes into contact with the isobutene to be polymerized. When the boron trifluoride and the alcohols (A) and (B) are introduced simultaneously into the polymerization medium already comprising the isobutene-comprising $C_4$ hydrocarbon mixture, the alcohols add onto the boron trifluoride faster than the polymerization is initiated or propagated, and so it is not the bare boron trifluoride that is active, but exclusively or virtually exclusively the inventive boron trifluoride-catalyst complex.

The amount of polymerization catalyst to be used is guided essentially by the type of cocatalyst and by the reaction conditions, more particularly the reaction temperature and the desired molecular weight of the polymer. It can be determined by a few sample tests for the respective reaction system. In general, the polymerization catalyst is used in amounts of 0.0001 to 1% by weight, especially 0.0005 to 0.5% by weight, in particular 0.001 to 0.1% by weight, based in each case on the boron trifluoride content in the catalyst complex and on isobutene used.

The cocatalyst mixture of (A) and (B) can be used in a substoichiometric, stoichiometric or superstoichiometric amount in relation to the boron trifluoride. The typical molar ratio of boron trifluoride to the cocatalyst mixture, i.e. to the sum of all cocatalyst alcohols from (A) and (B), is in the range from 2:1 to 1:10, preferably from 1.5:1 to 1:5, especially from 1.25:1 to 1:2, in particular from 1:1 to 1:1.5. The amount of cocatalyst mixture can influence the setting of the molecular weight to be achieved in the isobutene homopolymer and hence serve for control of the molecular weight thereof.

The polymerization can be effected either batchwise or preferably continuously. The process according to the invention for preparing high-reactivity isobutene homopolymers is suitable in principle both for performance at low temperatures, for example at −90° C. to 0° C., and at higher temperatures, i.e. at least 0° C., for example at 0° C. to +50° C. The polymerization in the process according to the invention is preferably, however, performed at temperatures in the range from −60° C. to +40° C., especially from −40° C., to +20° C., in particular from −25° C. to 0° C.

The polymerization is performed generally at a pressure of 700 mbar to 20 bar, especially at a pressure of 1 bar to 10 bar, in particular at a pressure of 1.2 bar to 7 bar. An elevated pressure normally brings advantages given the $C_4$ hydrocarbon mixture used and given some of the inert diluents which may also be used.

The polymerization reactors used for the process according to the invention may in principle be all batchwise or continuous reactors types suitable for such liquid phase polymerizations, for example stirred tanks, stirred tank cascades, tubular reactors or loop reactors. When the polymerization in the process according to the invention is effected at or above the boiling temperature of any inert diluents which may also be used or of the monomer to be polymerized, it is preferably performed in pressure vessels, for example in autoclaves or in pressure reactors.

The polymerization in the process according to the invention can be performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane, trichloromethane (chloroform), 1,1-dichloroethane, 1,2-dichloroethane, trichloroethane and 1-chlorobutane, and also halogenated aromatic hydrocarbons, and alkylaromatics halogenated in the alkyl side chains, such as chlorobenzene, monofluoromethylbenzene, difluoromethylbenzene and trifluoromethylbenzene, and mixtures of the aforementioned diluents. Appropriately, the diluents are freed of impurities such as water or mineral acids prior to use, for example by adsorption on solid adsorbents such as activated carbon, molecular sieves or ion exchangers. The inert components of the isobutenic $C_4$ hydrocarbon mixture used as a feedstock naturally also function as diluents or as constituents of the solvent mixtures mentioned.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm by weight and especially less than 5 ppm by weight. In general, the feedstock will therefore be dried before use by physical and/or chemical measures. More particularly, it has been found to be useful to admix aliphatic or cycloaliphatic hydrocarbons used as diluents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the isobutenic $C_4$ hydrocarbon mixture. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieve.

To stop the reaction, the reaction mixture is preferably deactivated, for example by adding sufficient amounts of a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

The process according to the invention serves to prepare high-reactivity isobutene homopolymers having a content of terminal vinylidene double bonds (α-double bonds) per polyisobutene chain end of preferably at least 50 mol %, especially of at least 60 mol %, more preferably of at least 70 mol %, in particular of at least 75 mol %.

The high-reactivity isobutene homopolymers prepared by the process according to the invention usually have a polydispersity (PDI=$M_w/M_n$) of 1.05 to than 3.5, preferably of 1.05 to 2.5, more preferably of 1.05 to 2.0 and especially of 1.1 to 1.85. Typical PDI values in the case of an optimal process regime are 1.2 to 1.7.

The high-reactivity isobutene homopolymers prepared by the process according to the invention typically possess a number-average molecular weight $M_n$ (determined by gel permeation chromatography) of 300 to 50 000, preferably of 500 to 10 000, especially of 600 to 5000, in particular of 700 to 2500, for example of 950 to 1050 or of 2200 to 2400.

The mixture of the alcohol components (A) and (B) used in the context of the present invention offers advantages over the use of an equal molar amount of the pure primary alcohol (A) or of the pure secondary alcohol (B). The effects which occur The following table reports the respective amount of alcohol or alcohol mixture used and the amount of boron trifluoride required in each case, and also the analytical data for the products obtained in each case (examples No. 1 and 2 serve for comparison):

| Ex. No. | Alcohol mixture [% by wt.:% by wt.] | Amount of alcohol | Amount of $BF_3$ | Fluorine content [ppm by wt.] | $M_n$ | alpha [mol %] |
|---|---|---|---|---|---|---|
| 1 | Pure MeOH | 6 g/h | 7 g/h | 143 | 988 | 71 |
| 2 | Pure IPOH | 12 g/h | 23 g/h | 50 | 1003 | 69 |
| 3 | MeOH:IPOH = 50:50 | 8 g/h | 8 g/h | 73 | 966 | 73 |
| 4 | MeOH:IPOH = 30:70 | 11 g/h | 13 g/h | 61 | 991 | 71 |
| 5 | MeOH:IPOH = 70:30 | 7 g/h | 7 g/h | 87 | 967 | 70 |
| 6 | MeOH:2BOH = 50:50 | 10 g/h | 11 g/h | 69 | 1009 | 76 |

MeOH = methanol, IPOH = isopropanol, 2BOH = 2-butanol can be referred to as synergistic. The use of the mixture of (A) and (B) as a cocatalyst system for the boron trifluoride ensures both a low fluorine content in the polymer and a low boron trifluoride consumption with equally good product properties of the polyisobutene obtained, especially when $C_4$ hydrocarbon mixtures or technical $C_4$ hydrocarbon streams which also comprise $C_4$ olefins other than isobutene in significant amounts are used as a feedstock.

The examples which follow are intended to illustrate the present invention without restricting it.

EXAMPLES

The examples which follow were conducted in a continuous polymerization apparatus composed of a jacket-cooled reactor having a capacity of 800 ml and a mechanical stirrer, a raw material introduction tube with precooling of the $C_4$ hydrocarbon stream used, an inlet tube for gaseous boron trifluoride, a dropping funnel for the alcohol or alcohol mixture used, and a suction stop for the continuous discharge of the reactor contents. The polymerization was conducted at a constant internal reactor temperature of −17° C. The flow rate (=feedstock introduction rate=crude product discharge rate) was 9 l/h.

The composition of the $C_4$ hydrocarbon stream used as a feedstock, which is typical of a raffinate 1 stream, was as follows:

| | |
|---|---|
| isobutene | 39.3% by weight |
| 1-butene | 32.2% by weight |
| trans-2-butene | 8.4% by weight |
| cis-2-butene | 5.8% by weight |
| isobutane | 4.1% by weight |
| n-butane | 10.2% by weight |
| 1,3-butadiene | 285 ppm by weight |

For workup, the still cold reactor discharge was treated with an excess of demineralized water at 70° C. and mixed vigorously. The amount of hot water was selected such that the mixing temperature of the two phases was about 20° C. This already vaporized a portion of the volatile organic compounds.

After a residence time of at least 20 minutes, the upper (organic) phase was removed and product samples for the analysis of the organic fluorine content in the polymer and of the number-average molar mass ($M_n$) and of the content of terminal vinylidene alpha-double bonds ("alpha") of the polymer were freed of the residual organic compounds in a rotary evaporator under reduced pressure (oil bath temperature: 150° C. at 30 mbar for 30 minutes).

The invention claimed is:

1. A boron trifluoride-catalyst complex for polymerization of isobutene, consisting of boron trifluoride as a polymerization catalyst and a cocatalyst mixture of
    (A) 10 to 90% by weight of at least one monohydric primary alcohol having 1 to 20 carbon atoms and
    (B) 90 to 10% by weight of at least one monohydric secondary alcohol having 3 to 20 carbon atoms,
    where the molar ratio of boron trifluoride to the sum of all cocatalyst alcohols from (A) and (B) is 2:1 to 1:10,
    wherein an isobutene homopolymer formed by reacting isobutene in the presence of said boron-trifluoride catalyst complex has a fluorine content of less than 143.

2. The boron trifluoride-catalyst complex according to claim 1, in which the at least one monohydric primary alcohol (A) is selected from methanol, ethanol, 1-propanol and 1-butanol.

3. The boron trifluoride-catalyst complex according to claim 1 or 2, in which the at least one monohydric secondary alcohol (B) is selected from isopropanol and 2-butanol.

4. A process for preparing high-reactivity isobutene homopolymers having a number-average molecular weight of 300 to 50 000 by polymerizing isobutene in the liquid phase in the presence of a polymerization catalyst based on boron trifluoride, where as a feedstock a $C_4$ hydrocarbon mixture comprising at least 20% by weight of isobutene and a total of at least 10% by weight of other $C_4$-olefins, which comprises using, as the polymerization catalyst, a boron trifluoride-catalyst complex according claim 1
    wherein said high-reactivity isobutene homopolymer has a fluorine content of less than 143 ppm and wherein said polymerization catalyst and isobutene are reacted at a molar ratio of $BF_3$:isobutene of less than 0.0085.

5. The process for preparing isobutene homopolymers according to claim 4, wherein the process is operated continuously and the feedstock used is a technical $C_4$ hydrocarbon stream selected from $C_4$ raffinates, $C_4$ cuts from isobutane dehydrogenation, and $C_4$ cuts from steamcrackers and fluid catalyzed crackers.

6. The process for preparing isobutene homopolymers according to claim 4, wherein the polymerization is performed at temperatures in the range from −60° C. to +40° C.

7. The process according to claim 4 for preparation of isobutene homopolymers having a content of terminal vinylidene double bonds of at least 50 mol %.

8. The boron trifluoride-catalyst complex according to claim 1, wherein said mixture is composed of 45 to 55% by weigh of (A) and 45 to 55% by weight of (B), based on said mixture.

9. The boron trifluoride-catalyst complex according to claim 1, wherein said at least one monohydric primary alcohol is at least one primary alcohol selected from the group consisting of methanol, ethanol, n-propanol, n-butanol, isobutanol, n-pentanol, n-hexanol, n-heptanol, n-octanol, 2-ethylhexanol, n-nonanol, n-decanol, 2-propylheptanol, n-undecanol, n-dodecanol, n-tridecanol, isotridecanol, n-tetradecanol, n-hexadecanol, n-octadecanol and n-eicosanol.

10. The boron trifluoride-catalyst complex according to claim 1, wherein said at least one monohydric secondary alcohol is at least one secondary alcohol selected from the group consisting of isopropanol, 2-butanol, sec-pentanol, sec-hexanol, sec-heptanol, sec-octanol, sec-nonanol, sec-decanol, sec-undecanol, sec-dodecanol and sec-tridecanol.

11. The process according to claim 4, wherein said feedstock comprises 20-90 wt. % of isobutene.

12. The process according to claim 4, wherein said feedstock comprises 25-75 wt. % of isobutene.

13. The process according to claim 4, wherein said feedstock comprises 30-60 wt. % of isobutene.

14. The process according to claim 4, wherein said feedstock comprises 10-70 wt. % of other $C_4$-olefins.

15. The process according to claim 4, wherein said feedstock comprises 25-65 wt. % of other $C_4$-olefins.

16. The process according to claim 4, wherein said feedstock comprises 40-55 wt. % of other $C_4$-olefins.

* * * * *